Jan 6, 1931. C. JACKSON 1,787,449
METHOD OF FORMING AND MOLDING CONCRETE
Filed Jan. 10, 1929

INVENTOR
Corwill Jackson
BY Chappell &Earl
ATTORNEYS

Patented Jan. 6, 1931

1,787,449

UNITED STATES PATENT OFFICE

CORWILL JACKSON, OF CHICAGO, ILLINOIS

METHOD OF FORMING AND MOLDING CONCRETE

Application filed January 10, 1929. Serial No. 331,668.

The main objects of this invention are:

First, to provide a method of molding concrete whereby a superior product results in the matter of solidity, elimination of voids or honeycombing and substantially perfect bonding between the concrete and reinforcing elements.

Second, to provide a method of molding concrete which results in a very substantial saving in cement and at the same time results in a high quality or superior product.

Third, to provide a method of molding or treating concrete requiring a minimum of labor.

Fourth, to provide a method of molding concrete by means of which dry or non-flowing, non-workable mixtures of aggregates, cement and water may be placed within a mold and reduced to a flowing condition within the mold without the use of excess water.

Fifth, to provide an apparatus which is well adapted for use in the practicing of my improved method.

Objects relating to details and economies of my invention will appear from the description to follow. The invention is defined and pointed out in the claims.

A structure which is a preferred embodiment of my invention is illustrated in the accompanying drawing, in which.

Figure 1:
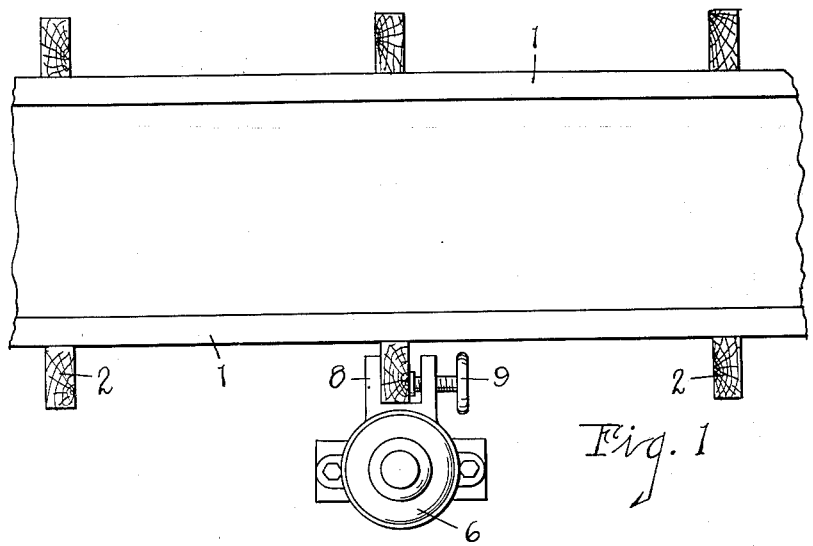
Fig. 1 is a fragmentary plan view of an apparatus suitable for the practice of my improved method, the mold parts being shown largely in conventional form.
Figure 2:
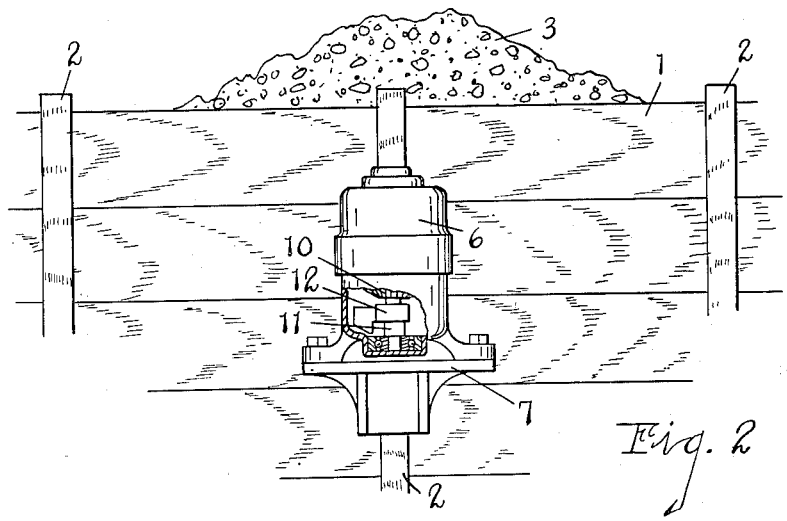
Fig. 2 is a fragmentary side elevation of the apparatus shown in Fig. 1, a concrete mixture being illustrated within the mold.

Referring to the accompanying drawing, 1, 1 represent the side walls of a wall form or mold, these being supported by vertical studding 2. A mixture of concrete is illustrated at 3 in Fig. 2.

Figure 3:
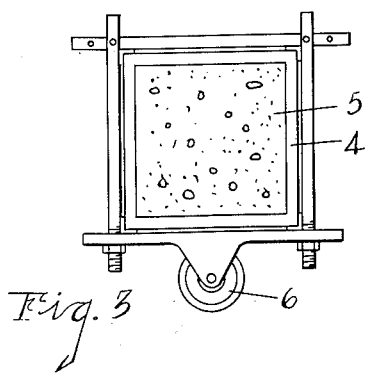
Fig. 3 is a plan view of a modification of my improvements especially adapted for use in the erection of columns.

In Fig. 3, I illustrate my improvements as adapted for the forming of columns, the column form being indicated at 4 and the concrete material therein at 5. I have not, in the accompanying drawing, illustrated any reinforces but it will be understood that such reinforces as desired may be employed, my improved method being especially desirable for use where reinforces are employed on account of the perfect bonding resulting.

In carrying out my method, I prepare a mixture of aggregate and cement with such proportion of water that the mixture is what is ordinarily designated as a dry, non-workable and non-flowing condition, that is, it will not flow into position when placed within a mold or form and cannot be tamped into place with satisfactory results.

The concrete mixture in this condition is placed within a form and the form or a wall thereof is vibrated with high frequency vibrations, the vibrations or forming being imparted and set up in the concrete mass whereby it is reduced to a semi-fluid or flowing condition within the form, the concrete flowing into position, air and voids being eliminated and the concrete forming a very close bond or union with the reinforces owing to the fact that it is brought into intimate contact therewith, the voids in the aggregate being filled so that the concrete is very solid or compact and non-porous. Also, owing to the fact that no excess water is employed, the resulting product is not rendered porous by the evaporation of the excess water and there is no loss of cement as is occasioned where the excess water is forced out of the concrete or is allowed to flow from the concrete in order to produce a flowing mixture.

To vibrate the form, I preferably employ a device such as illustrated consisting of a motor casing 6 which is bolted upon a support 7 having a clamp 8 thereon provided with a clamping screw 9 so that the motor casing through the support may be clamped upon a studding or other part of the form.

Within the casing is a rotor 10 having a shaft 11 with an unbalancing weight 12 thereon, the structure illustrated being an electric motor. The electrical connections however are not illustrated.

This results in high frequency vibrations or pulsations being imparted to the concrete mass, effectively and quite rapidly changing its condition, as stated, from the dry, harsh or granular, non-workable condition to a semi-fluid or flowing condition. In placing large masses of concrete such as in placing concrete dams, I employ with satisfactory results machines of the character illustrated in my application for Letters Patent No. 239,568, filed December 12, 1927. The machine is applied to a batch of the concrete mass of the character described with the result that its character is soon changed and the stiff mass is rendered fluid and workable, and worked into a mass homogeneous within itself and with that previously placed.

While the number of vibrations per minute can be considerably varied with satisfactory results, I prefer to employ means for producing vibrations at the rate of 2400 to 4000 per minute and have employed with highly satisfactory results motors having a speed of 3600 R. P. M.

My methods result not only in a very substantial saving in cement but also result in concrete of very high quality.

I have not attempted to illustrate various adaptations of my improved method and apparatus which I contemplate and which might be desirable for different conditions and structures but it is believed that this disclosure will enable those skilled in the art to embody or adapt my improvements as may be desired.

Having thus described my invention, what I claim as new and desire to secure by Letters Patent, is:

1. The method of molding concrete consisting of placing within a form a mixture of aggregate and cement with such proportion of water that the mixture is in a non-flowing condition, vibrating a wall of the form at high frequency thereby causing high frequency vibrations within the mixture and reducing it to flowing condition within the form.

2. The method of molding concrete consisting of placing within a form a mixture of aggregate and cement with such proportion of water that the mixture is in a non-fluid condition, and vibrating the form at high frequency thereby reducing the mixture to fluid condition within the form.

3. The method of molding concrete consisting of placing a dry concrete mixture within a form, and vibrating a wall of the form at high frequency thereby causing high frequency vibrations within the mixture and reducing it to flowing condition within the form.

4. The method of molding concrete consisting of placing a non-flowing concrete mixture within a form, and vibrating the form at high frequency thereby reducing the mixture to flowing condition within the form.

5. The method of molding concrete bodies consisting of placing within a form a mixture of cement and an aggregate with such proportion of water as to produce a non-flowing mixture, and rendering such mixture fluid within the form by vibrating a wall of the form at high frequency.

6. The method of molding concrete consisting of placing a dry non-flowing concrete mixture in a form, and subjecting the form to high frequency vibrations whereby the mixture is reduced to a flowing condition within the form.

7. The method of forming concrete consisting of placing within a form a mixture of cement and an aggregate with such proportion of water as to produce a non-flowing mixture, and rendering such mixture fluid within the form by vibrating the mixture at high frequency.

8. The method of molding concrete consisting of placing within a form a dry non-workable concrete mixture, and vibrating the mixture at high frequency thereby reducing it to a flowing condition within the form.

9. The method of forming concrete consisting of mixing cement and an aggregate with such proportion of water as to produce a non-fluid mixture, and rendering such mixture fluid by causing high frequency vibrations within the mixture.

10. The method of forming concrete consisting of placing a dry non-flowing concrete mixture in situ and subjecting to high frequency vibrations whereby the mixture is reduced to a flowing condition in situ.

11. The method of forming concrete consisting of placing a dry non-workable concrete mixture in situ, and vibrating the mass at high frequency whereby it is reduced to a workable condition in situ.

12. The method of forming concrete consisting of placing a harsh concrete mixture, and subjecting the mixture to high frequency vibrations whereby it is reduced to a workable flowing condition in situ.

13. The method of forming concrete consisting in mixing cement and an aggregate in such proportion of water as to produce a harsh non-fluid mixture, and rendering such mixture fluid by inducing high frequency vibrations within the mixture.

14. The method of forming concrete consisting of placing a mixture of cement and aggregate with a non-workable water content, and vibrating the mass at high frequency whereby it is reduced to a flowing condition in situ.

In witness whereof I have hereunto set my hand.

CORWILL JACKSON.